(12) United States Patent
Lu et al.

(10) Patent No.: US 10,751,737 B2
(45) Date of Patent: Aug. 25, 2020

(54) HUMANIZED SWITCHING DEVICE

(71) Applicant: XIAMEN EASO CO., LTD., Xiamen, Fujian (CN)

(72) Inventors: Haitao Lu, Xiamen (CN); Zhen Li, Xiamen (CN); Ximin Chen, Xiamen (CN)

(73) Assignee: XIAMEN EASO CO., LTD., Xiamen, Fujian (CN)

( * ) Notice: Subject to any disclaimer, the term of this patent is extended or adjusted under 35 U.S.C. 154(b) by 129 days.

(21) Appl. No.: 16/127,232

(22) Filed: Sep. 11, 2018

(65) Prior Publication Data

US 2020/0078800 A1   Mar. 12, 2020

(51) Int. Cl.
| | | |
|---|---|---|
| *F16K 11/02* | (2006.01) | |
| *B05B 1/16* | (2006.01) | |
| *F16K 31/60* | (2006.01) | |
| *F16K 11/044* | (2006.01) | |
| *B05B 12/00* | (2018.01) | |
| *F16K 11/06* | (2006.01) | |
| *F16K 11/07* | (2006.01) | |
| *F16K 35/04* | (2006.01) | |

(52) U.S. Cl.
CPC .......... *B05B 1/1672* (2013.01); *B05B 12/002* (2013.01); *F16K 11/0445* (2013.01); *F16K 31/602* (2013.01); *B05B 1/1663* (2013.01); *F16K 11/02* (2013.01); *F16K 11/06* (2013.01); *F16K 11/07* (2013.01); *F16K 35/04* (2013.01)

(58) Field of Classification Search
CPC ... B05B 1/1672; B05B 12/002; B05B 1/1663; F16K 11/0445; F16K 31/602; F16K 11/02; F16K 11/06; F16K 11/07; F16K 11/0712; F16K 35/04
USPC ......................................................... 251/297
See application file for complete search history.

(56) References Cited

U.S. PATENT DOCUMENTS

| | | | | |
|---|---|---|---|---|
| 1,100,317 A | * | 6/1914 | Masterson | F16K 35/04 251/297 |
| 2,657,709 A | * | 11/1953 | Gillerstrom | E21B 19/087 137/614.2 |
| 3,195,574 A | * | 7/1965 | William | F15B 13/04 137/625.69 |
| 3,722,800 A | * | 3/1973 | Shames | B05B 1/1663 239/447 |
| 4,026,325 A | * | 5/1977 | Loveless | F16K 11/044 137/625.26 |
| 4,979,530 A | * | 12/1990 | Breda | F16K 11/0856 137/100 |
| 5,172,866 A | * | 12/1992 | Ward | B05B 3/04 239/446 |
| 5,433,248 A | * | 7/1995 | Schmidt | F16K 11/07 137/625.48 |
| 6,138,705 A | * | 10/2000 | Chen | G05D 23/1313 137/315.11 |

(Continued)

*Primary Examiner* — Matthew W Jellett
*Assistant Examiner* — Christopher D Ballman
(74) *Attorney, Agent, or Firm* — Chun-Ming Shih

(57) ABSTRACT

A humanized switching device includes a tee pipe and a switching lever. The tee pipe has a switching chamber therein. The switching chamber is formed with a water inlet and a plurality of water outlets. The switching lever is provided with a water-stop part. The switching lever is movable to change the position of the water-stop part between the water inlet and the water outlets to realize the switching of the water passage.

16 Claims, 3 Drawing Sheets

(56) References Cited

U.S. PATENT DOCUMENTS

| | | | | |
|---|---|---|---|---|
| 6,877,523 | B2* | 4/2005 | Dempsey | F16K 11/076 |
| | | | | 137/597 |
| 7,562,860 | B2* | 7/2009 | Graf | B05B 1/005 |
| | | | | 251/209 |
| 8,573,512 | B2* | 11/2013 | Hu | B05B 1/1663 |
| | | | | 239/443 |
| 9,909,684 | B2* | 3/2018 | Zhou | F16K 11/044 |
| 10,119,621 | B2* | 11/2018 | Breda | F16K 11/0856 |
| 2005/0178858 | A1* | 8/2005 | Roman | B05B 1/1654 |
| | | | | 239/526 |
| 2006/0261191 | A1* | 11/2006 | Chang | B05B 1/1663 |
| | | | | 239/525 |
| 2013/0092762 | A1* | 4/2013 | Kikuchi | B05B 1/18 |
| | | | | 239/569 |
| 2015/0115065 | A1* | 4/2015 | Lin | B05B 1/1618 |
| | | | | 239/446 |
| 2017/0182504 | A1* | 6/2017 | Ho | B05B 1/1663 |
| 2019/0283049 | A1* | 9/2019 | Lin | B05B 1/18 |

* cited by examiner

HUMANIZED SWITCHING DEVICE

BACKGROUND OF THE INVENTION

1. Field of the Invention

The present invention relates to a shower device, and more particularly to a humanized switching device.

2. Description of the Prior Art

In general, the water passages of a shower head and a hand-held shower of a shower device are diverted through a three-way water distributor. The direction of the water flow can be changed by adjusting a switching valve in the three-way water distributor, so that shower head or the hand-held shower can spray water to meet different bathing needs.

A conventional three-way water distributor controls the switching valve by rotating a knob to switch the water passages. The unified knob design lacks novelty and cannot meet the needs of some users. In order to facilitate the rotation of the knob, the knob is provided with a handle. The structural design of the external handle increases the size of the water distributor. Due to the moisture in the bathroom and repeated swing of the handle, the service life of the handle is affected greatly, and the risk of damage is very high. Once damaged, it is necessary to replace the knob and handle, or the entire water distributor. There is no switching valve that has a simple structure and takes less space on the market.

Accordingly, the inventor of the present invention has devoted himself based on his many years of practical experiences to solve these problems.

SUMMARY OF THE INVENTION

The primary object of the present invention is to provide a humanized switching device, which has the advantages of simple structure, taking less space, convenient and labor-saving operation, and quick switching of water passages.

In order to achieve the above object, the present invention adopts the following technical solutions.

A humanized switching device comprises a tee pipe and a switching lever. The tee pipe includes an inlet pipe, a first outlet pipe, a second outlet pipe, and a switching chamber. The switching chamber is sequentially formed with a water inlet, a left water outlet, and a right water outlet. The water inlet is in communication with the inlet pipe. The left water outlet is in communication with the first outlet pipe. The right water outlet is in communication with the second outlet pipe. An outer circumference of the switching lever is sequentially formed with a left water-stop part, a middle water-stop part and a right water-stop part that are movably fitted against an inner wall of the switching chamber. The left water-stop part is movably fitted between a left end of the switching chamber and a left wall of the left water outlet. The middle water-stop part is movably fitted between a right wall of the left water outlet and a left wall of the right water outlet. The right water-stop part is movably fitted between a right wall of the right water outlet and a right end of the switching chamber.

Preferably, a distance between a right wall of the left water-stop part and a left wall of the middle water-stop part is not less than a distance between the left wall of the left water outlet and a right wall of the water inlet. A distance between a left wall of the right water-stop part and a right wall of the middle water-stop part is not less than a distance between the right wall of the right water outlet and a left wall of the water inlet. A distance between a left wall of the left water-stop part and the left wall of the middle water-stop part is not greater than a distance between the right wall of the left water outlet and the left end of the switching chamber. A distance between the right wall of the middle water-stop part and a right wall of the right water-stop part is not greater than a distance between the left wall of the right water outlet and the right end of the switching chamber.

Preferably, an outer circumference of each of the left water-stop part, the middle water-stop part and the right water-stop part is formed with a groove, and the groove is provided with a sealing ring.

Preferably, two ends of the switching lever are connected with left and right buttons respectively, and the left and right buttons are movably disposed at the left and right ends of the switching chamber, respectively.

Preferably, a switching tube is formed in the switching chamber. The switching lever is movably disposed in the switching tube. The water inlet, the first water outlet and the second water outlet are all disposed on the switching tube. The left and right buttons are movably fitted at two ends of the switching tube, respectively.

Preferably, the switching lever has a length greater than that the switching tube, and the difference between the lengths of the two is not greater than a distance between the right wall of the left water outlet and the left wall of the right water outlet. The left end of the switching tube is shorter than the left end of the switching chamber, and a distance between the two is not less than a thickness of a top surface of the left button. The right end of the switching tube is shorter than the right end of the switching chamber, and a distance between the two is not less than a thickness of a top surface of the right button.

Preferably, the junctions of the left and right walls of the water inlet and an inner cavity of the switching tube are provided with chamfers.

Preferably, the switching tube includes an inner core, the switching tube is separated from an inner side of the water inlet to form the inner core; the inner core is movably connected to the inner wall of the switching chamber.

Preferably, the switching lever is provided with a mounting groove. The mounting groove is provided with a limiting member. An elastic member is fitted between the mounting groove and the limiting member. An inner wall of the switching tube is provided with a limiting recess for an end of the limiting member to be movably engaged therein.

The above structure is simple and easy to produce. The water passage is switched by moving the switching lever, and only the water-stop part may be worn during use. The maintenance cost is low. Compared with the structure of the knob-type switching valve, the possibility of breakage is lower and the service life is longer. The structure of the present invention is compact and takes up less space. The user can easily move the switching lever to switch the water passage to meet different bathing needs.

DETAILED DESCRIPTION OF THE PREFERRED EMBODIMENTS

Embodiments of the present invention will now be described, by way of example only, with reference to the accompanying drawings.

Spatially relative terms, such as "upper," "lower," "left," "right," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures.

Figure 1:
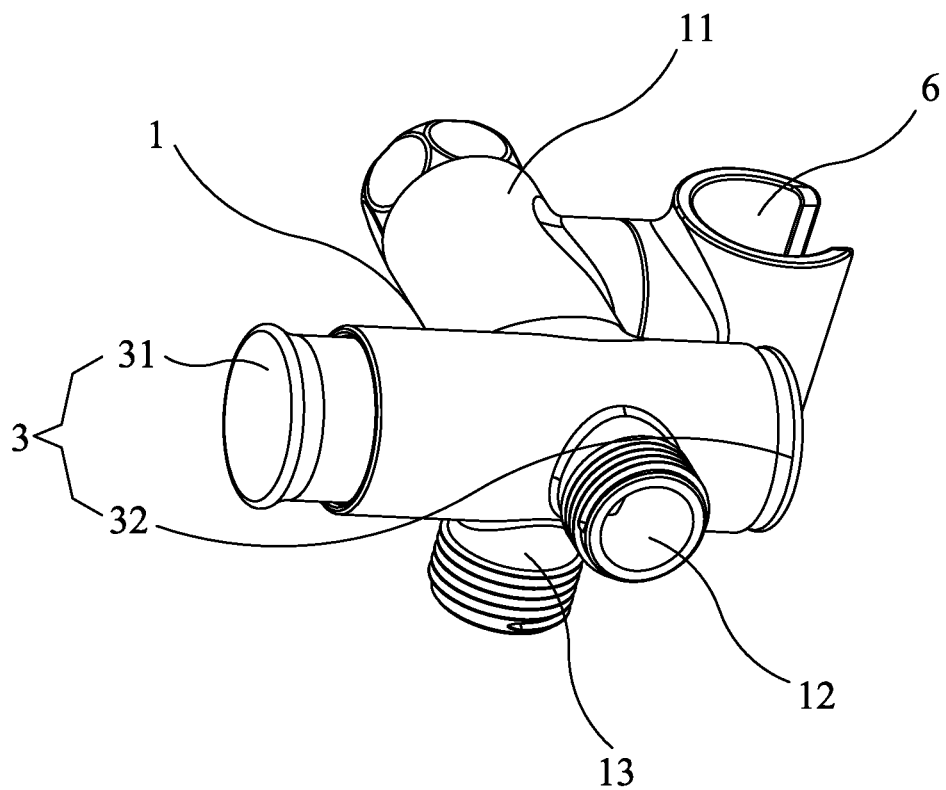
FIG. 1 is a perspective view of the present invention.
Figure 2:
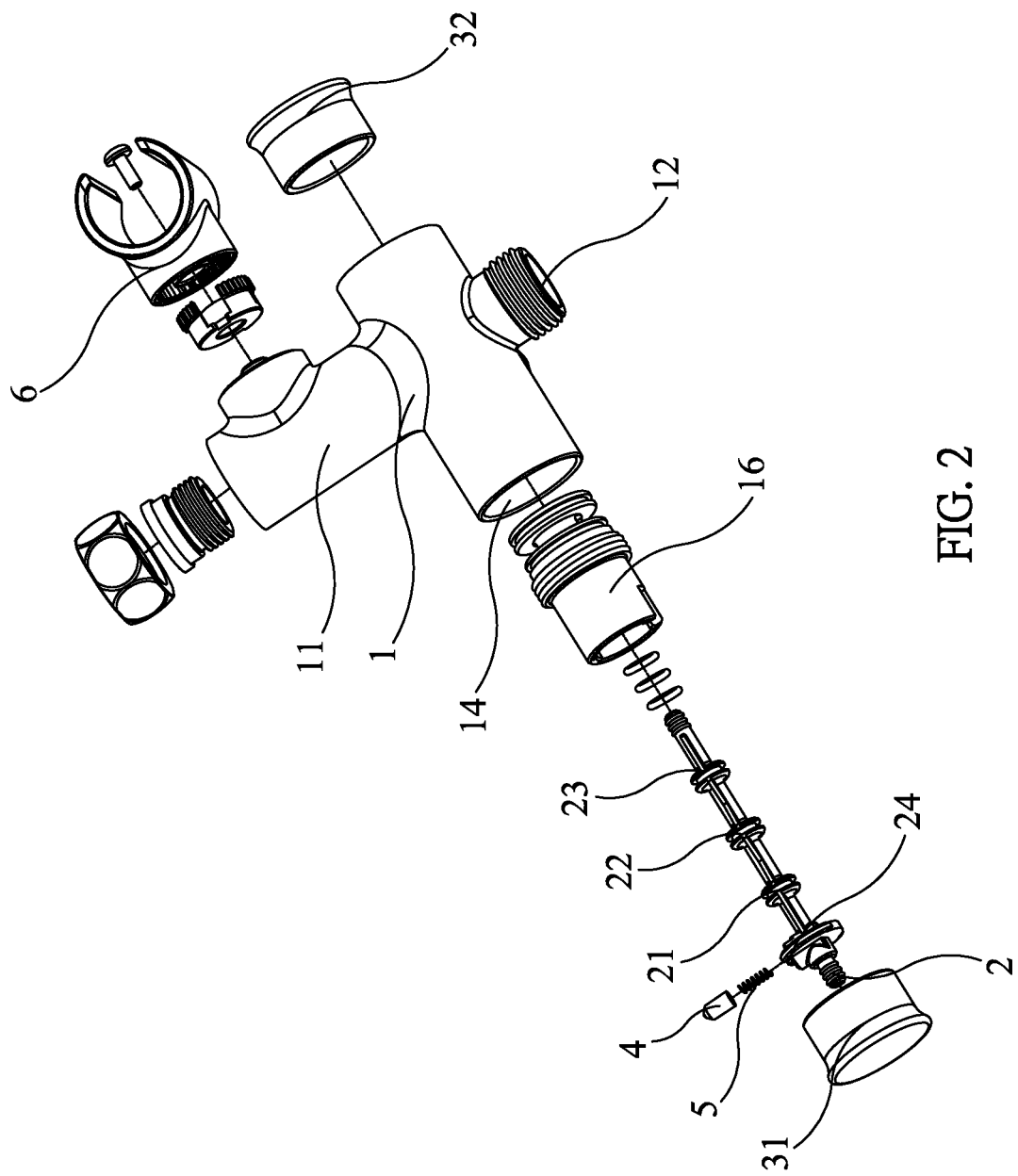
FIG. 2 is an exploded view of the present invention.
Figure 3:
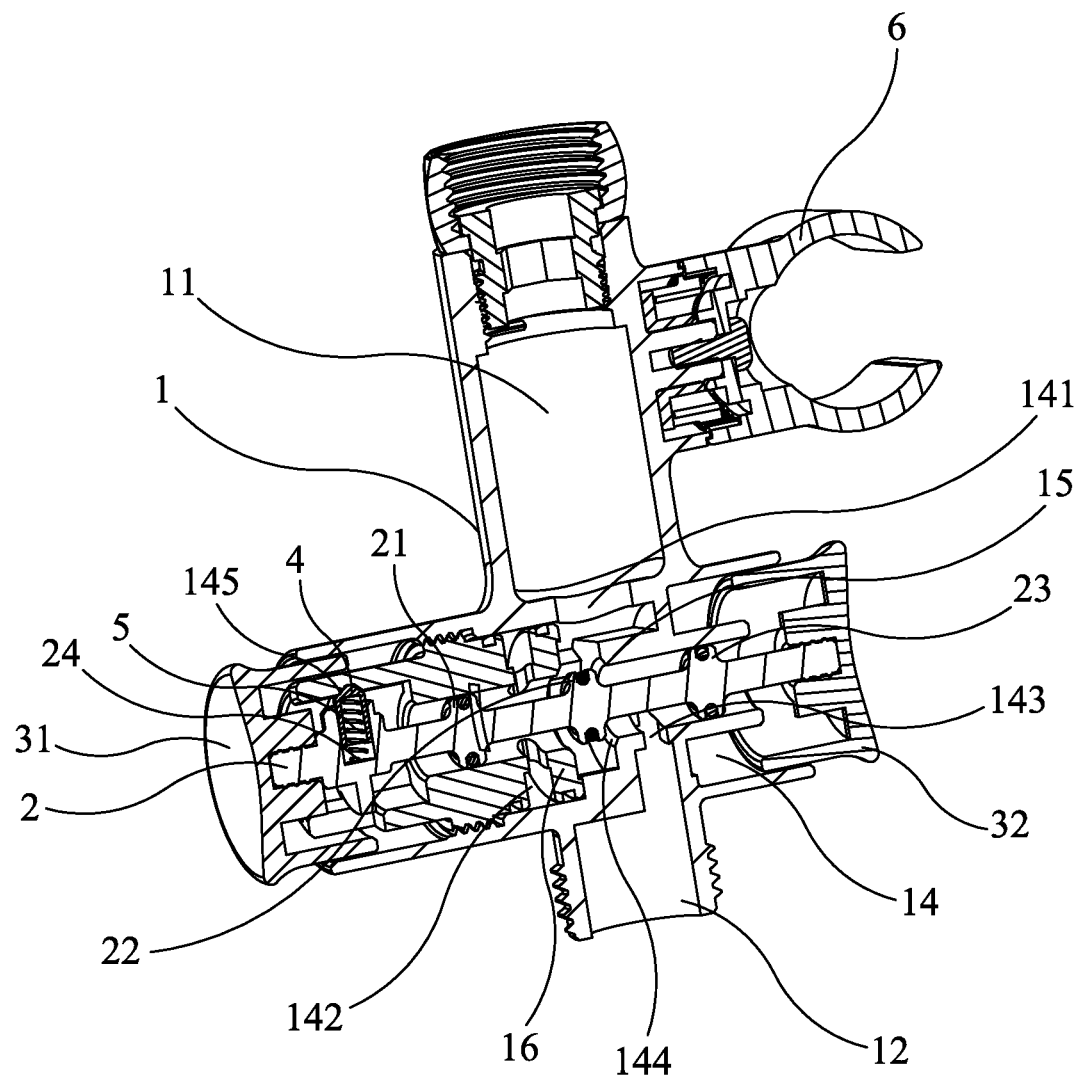
FIG. 3 is a cross-sectional view of the present invention.

As shown in FIG. 1 to FIG. 3, a humanized switching device comprises a tee pipe 1 and a switching lever 2. The tee pipe includes an inlet pipe 11, a first outlet pipe 12, a second outlet pipe 13, and a switching chamber 14. The switching chamber 14 is sequentially formed with a water inlet 141, a left water outlet 142, and a right water outlet 143. The water inlet 141 is in communication with the inlet pipe 11. The left water outlet 142 is in communication with the first outlet pipe 12. The right water outlet 143 is in communication with the second outlet pipe 13. The water flows to the water inlet 141 through the water inlet pipe 141, and flows into the switching chamber 14, and flows out of the first water outlet pipe 12 through the left water outlet 142 and out of the second water outlet pipe 13 through the right water outlet 143.

The outer circumference of the switching lever 2 is sequentially formed with a left water-stop part 21, a middle water-stop part 22 and a right water-stop part 23 that are movably fitted against the inner wall of the switching chamber 14. The left water-stop part 21, the middle water-stop part 22 and the right water-stop part 23 are configured to block the passage of water. In order to enhance the sealing property, grooves are formed on the outer circumferences of the left water-stop part 21, the middle water-stop part 22, and the right water-stop part 23. A sealing ring is fitted on each of the grooves. The thickness of the middle water-stop part 22 of the present invention is less than the width of the water inlet 141, so that the middle water-stop part 22 cannot block the water inlet 141. When the middle water-stop part 22 is fitted at one side of the water inlet 141, the water can only flow to the switching chamber 14 at the other side of the water inlet 141. When the middle water-stop part 22 is fitted between the left wall and the right wall of the water inlet 141, the water can flow to both sides of the middle water-stop part 22 to achieve mixing of the water.

The distance between the right wall of the left water-stop part 21 and the left wall of the middle water-stop part 22 is not less than the distance between the left wall of the left water outlet 142 and the right wall of the water inlet 141. The distance between the left wall of the right water-stop part 23 and the right wall of the middle water-stop part 22 is not less than the distance between the right wall of the right water outlet 143 and the left wall of the water inlet 141. The distance between the left wall of the left water-stop part 21 and the left wall of the middle water-stop part 22 is not greater than the distance between the right wall of the left water outlet 142 and the left end of the switching chamber 14. The distance between the right wall of the middle water-stop part 22 and the right wall of the right water-stop part 23 is not greater than the distance between the left wall of the right water outlet 143 and the right end of the switching chamber 14. When the switching lever 2 is moved in the switching chamber 14, the left water-stop part 21 is movably fitted between the left end of the switching chamber 14 and the left wall of the left water outlet 142; the middle water-stop part 22 is movably fitted between the right wall of the left water outlet 142 and the left wall of the right water outlet 143; and the right water-stop part 23 is movably fitted between the right wall of the right water outlet 143 and the right end of the switching chamber 14.

When the middle water-stop part 22 is fitted between the right wall of the left water outlet 142 and the left wall of the water inlet 141, the switching chamber 14 between the right wall of the middle water-stop part 22 and the left wall of the right water-stop part 23 forms a water passage. The water flows through the inlet pipe 11, the water inlet 141, the right water outlet 143, and the second outlet pipe 13. At this time, the water is discharged only from the second outlet pipe 13. When the middle water-stop part 22 is fitted between the left wall and the right wall of the water inlet 141, the switching chamber 14 between the right wall of the left water-stop part 21 and the left wall of the right water-stop part 23 forms a water passage. The water flows through the inlet pipe 11 and the water inlet 141 to both sides of the middle water-stop part 22, and flows out of the first outlet pipe 12 via the left water outlet 142, and flows out of the second outlet pipe 13 via the right water outlet 143. At this time, the water is discharged from the first outlet pipe 12 and the second outlet pipe 13. When the middle water-stop part 22 is fitted between the right wall of the water inlet 141 and the left wall of the right water inlet 143, the switching chamber 14 between the left wall of the middle water-stop part 22 and the right wall of the left water-stop part 21 forms a water passage. The water flows through the inlet pipe 11, the water inlet 141, the left water outlet 142, and the first outlet pipe 12. At this time, the water is discharged only from the first outlet pipe 12. By moving the switching lever 2, the position of the switching lever 2 in the switching chamber 14 is changed to achieve the purpose of switching the water passage.

In order to facilitate the movement of the switching lever 2 and improve the user's experience, two ends of the switching lever 2 are provided with buttons 3. The buttons 3 are movably disposed at the left and right ends of the switching chamber 14. The buttons 3 include a left button 31 and a right button 32 which are screwed to the left end and the right end of the switching lever 2, respectively. When the left button 31 is pressed, the switching lever 2 is moved to the right. The discharge state of the present invention sequentially switches the water discharged from the second outlet pipe, the mixed water, and the water discharged from the first outlet pipe. When the right button 32 is pressed, the discharge state is opposite to that of the left button 31.

In order to limit the range of the movement of the buttons 3 at the left and right ends of the switching chamber 14, a switching tube 15 is formed in the switching chamber 14. The switching lever 2 is movably disposed in the switching tube 15. The buttons 3 are movably fitted at the ends of the switching tube 15. The water inlet 141, the first water outlet 142 and the second water outlet 143 are all disposed on the switching tube 15. The length of the switching lever 2 is greater than that the switching tube 15, and the difference between the lengths of the two is not greater than the distance between the right wall of the left water outlet 142 and the left wall of the right water outlet 143. The left end of the switching tube 15 is shorter than the left end of the switching chamber 14, and the distance between the two is not less than the thickness of the top surface of the left button 31. The right end of the switching tube 15 is shorter than the right end of the switching chamber 14, and the distance between the two is not less than the thickness of the top surface of the right button 32. When the left button 31 is embedded in the left end of the switching chamber 14 and abuts against the left end of the switching tube 15 or the right button 32 is embedded in the right end of the switching chamber 14 and abuts against the right end of the switching tube 15, the outer surfaces of the left button 31 and the right button 32 are flush with or extend out of the left and right ends of the switching chamber 14, respectively.

The switching tube 15 further includes an inner core 16 movably fitted in the switching chamber 14. The switching tube 15 is separated from the inner side of the water inlet 141 to form the inner core 16. In this embodiment, the left water outlet 142 is disposed on the inner core 16. The right water outlet 143 may be disposed on the inner core 16. The inner core 16 is movably connected to the inner wall of the switching chamber 14, which may be connected through screw threads. The junctions of the left and right walls of the water inlet 141 and the inner cavity of the switching tube 15 are provided with chamfers 144 for a sealing ring to be movably fitted. The chamfer 144 provides a seating and guiding space to reduce the friction between the middle water-stop part 22, the sealing ring and the inner wall of the switching tube 15, thereby prolonging the service life of the switching device of the present invention. The split design of the switching tube 15 is more convenient for the mold to have the chamfers 144.

In order to judge the state of the mixed water for the user to know that the middle water-stop part 22 is moved to be between the left wall and the right wall of the water inlet 141, the switching lever 2 of the present invention is provided with a mounting groove 24. The mounting groove 24 is provided with a limiting member 4. An elastic member 5 is fitted between the mounting groove 24 and the limiting member 4. The elastic member 5 is a spring. The inner wall of the switching tube 15 is provided with a limiting recess 145 for the end of the limiting member 4 to be movably engaged therein. The limiting recess 145 is an arc-shaped recess for limiting the movement of the end of the limiting member 4. The distance between the limiting recess 145 and the center line of the water inlet 141 is equal to the distance between the center of the mounting groove 24 and the center line of the middle water-stop part 22, that is, when the middle water-stop part 22 is moved to be between the left wall and the right wall of the water inlet 141, the end of the limiting member 4 is engaged in the limiting recess 145 to generate a resistance to remind the user that the current state is to discharge mixed water.

The outer wall of the tee pipe 1 is fixedly connected with a bracket 6 for displacement of a shower head.

The above structure is simple and easy to produce and different from the design of the existing knob-type switching valve. The style is novel. The water passage is switched by moving the switching lever 2, and only the water-stop part and the sealing ring will have a certain degree of wear during use. Even if they are damaged, the maintenance cost is low. Compared with the structure of the knob-type switching valve, the possibility of breakage is lower and the service life is longer. The structure of the present invention is compact and takes up less space. The user can easily move the switching lever by pressing the button 3 to switch the water passage in the tee pipe 1 to meet different bathing needs.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A humanized switching device, comprising a tee pipe and a switching lever, the tee pipe including an inlet pipe, a first outlet pipe, a second outlet pipe and a switching chamber; the switching chamber being sequentially formed with a water inlet, a left water outlet and a right water outlet; the water inlet being in communication with the inlet pipe, the left water outlet being in communication with the first outlet pipe, the right water outlet being in communication with the second outlet pipe; an outer circumference of the switching lever being sequentially formed with a left water-stop part, a middle water-stop part and a right water-stop part that are movably fitted against an inner wall of the switching chamber; the left water-stop part being movably fitted between a left end of the switching chamber and a left wall of the left water outlet; the middle water-stop part being movably fitted between a right wall of the left water outlet and a left wall of the right water outlet; the right water-stop part being movably fitted between a right wall of the right water outlet and a right end of the switching chamber; wherein the switching lever is provided with a mounting groove, the mounting groove is provided with a limiting member, an elastic member is fitted between the mounting groove and the limiting member; a switching tube is formed in the switching chamber; an inner wall of the switching tube is provided with a limiting recess for an end of the limiting member to be movably engaged therein.

2. The humanized switching device as claimed in claim 1, wherein a distance between a left wall of the right water-stop part and a right wall of the middle water-stop part is not less than a distance between the right wall of the right water outlet and a left wall of the water inlet, a distance between a left wall of the left water-stop part and the left wall of the middle water-stop part is not greater than a distance between the right wall of the left water outlet and the left end of the switching chamber, and a distance between the right wall of the middle water-stop part and a right wall of the right water-stop part is not greater than a distance between the left wall of the right water outlet and the right end of the switching chamber.

3. The humanized switching device as claimed in claim 2, wherein an outer circumference of each of the left water-stop part, the middle water-stop part and the right water-stop part is formed with a groove, and the groove is provided with a sealing ring.

4. The humanized switching device as claimed in claim 3, wherein two ends of the switching lever are connected with left and right buttons respectively, and the left and right buttons are movably disposed at the left and right ends of the switching chamber, respectively.

5. The humanized switching device as claimed in claim 4, wherein the switching lever is movably disposed in the switching tube; the water inlet, the first water outlet and the second water outlet are all disposed on the switching tube; and the left and right buttons are movably fitted at two ends of the switching tube, respectively.

6. The humanized switching device as claimed in claim 5, wherein the switching lever has a length greater than that the switching tube, and the difference between the lengths of the two is not greater than a distance between the right wall of the left water outlet and the left wall of the right water outlet; the left end of the switching tube is shorter than the left end of the switching chamber, and a distance between the two is not less than a thickness of a top surface of the left button; the right end of the switching tube is shorter than the right end of the switching chamber, and a distance between the two is not less than a thickness of a top surface of the right button.

7. The humanized switching device as claimed in claim 5, wherein the junctions of the left and right walls of the water inlet and an inner cavity of the switching tube are provided with chamfers.

8. The humanized switching device as claimed in claim 7, wherein the switching tube includes an inner core, the switching tube is separated from an inner side of the water inlet to form the inner core; the inner core is movably connected to the inner wall of the switching chamber.

9. The humanized switching device as claimed in claim 5, wherein the switching lever is provided with a mounting groove, the mounting groove is provided with a limiting member, an elastic member is fitted between the mounting groove and the limiting member; an inner wall of the switching tube is provided with a limiting recess for an end of the limiting member to be movably engaged therein.

10. The humanized switching device as claimed in claim 1, wherein an outer circumference of each of the left water-stop part, the middle water-stop part and the right water-stop part is formed with a groove, and the groove is provided with a sealing ring.

11. The humanized switching device as claimed in claim 10, wherein two ends of the switching lever are connected with left and right buttons respectively, and the left and right buttons are movably disposed at the left and right ends of the switching chamber, respectively.

12. The humanized switching device as claimed in claim 11, wherein a switching tube is formed in the switching chamber, the switching lever is movably disposed in the switching tube; the water inlet, the first water outlet and the second water outlet are all disposed on the switching tube; and the left and right buttons are movably fitted at two ends of the switching tube, respectively.

13. The humanized switching device as claimed in claim 12, wherein the switching lever has a length greater than that of the switching tube, and the difference between the lengths of the two is not greater than a distance between the right wall of the left water outlet and the left wall of the right water outlet; the left end of the switching tube is shorter than the left end of the switching chamber, and a distance between the two is not less than a thickness of a top surface of the left button; the right end of the switching tube is shorter than the right end of the switching chamber, and a distance between the two is not less than a thickness of a top surface of the right button.

14. The humanized switching device as claimed in claim 12, wherein the junctions of the left and right walls of the water inlet and an inner cavity of the switching tube are provided with chamfers.

15. The humanized switching device as claimed in claim 14, wherein the switching tube includes an inner core, the switching tube is separated from an inner side of the water inlet to form the inner core; the inner core is movably connected to the inner wall of the switching chamber.

16. The humanized switching device as claimed in claim 12, wherein the switching lever is provided with a mounting groove, the mounting groove is provided with a limiting member, an elastic member is fitted between the mounting groove and the limiting member; an inner wall of the switching tube is provided with a limiting recess for an end of the limiting member to be movably engaged therein.

* * * * *